United States Patent [19]
Milad

[11] Patent Number: 5,119,753
[45] Date of Patent: Jun. 9, 1992

[54] ARTICULATABLE MECHANISM

[76] Inventor: Anis I. Milad, 2938 Yorkway, Baltimore, Md. 21222

[21] Appl. No.: 569,407

[22] Filed: Aug. 20, 1990

[51] Int. Cl.[5] .............................................. B63G 8/16
[52] U.S. Cl. .................................. 114/338; 74/665 B; 901/29; 440/63
[58] Field of Search ............... 901/18, 25, 29; 74/661, 74/665 B, 665 L, 665 G, 665 N; 244/51, 52, 66, 76 J; 475/1, 2; 239/265.35, 587; 114/338, 337; 440/58-63, 53

[56] References Cited

U.S. PATENT DOCUMENTS

| 1,409,850 | 3/1922 | Haney | 244/51 X |
| 4,501,522 | 2/1985 | Causer et al. | 901/25 X |
| 4,732,106 | 3/1988 | Milad | 440/63 X |
| 4,907,937 | 3/1990 | Milenkovic | 901/29 X |

*Primary Examiner*—Edwin L. Swinehart
*Attorney, Agent, or Firm*—Leonard Bloom

[57] ABSTRACT

This invention is an articulatable mechanism applicable to a wide variety of situations. The device provides a rotational component as well as a pivotal component providing practical propulsion in polar coordinates instead of customary linear transmission. This device could be used for steering propulsion devices by controlling the orientation and direction of a propeller shaft or rocket exhaust. Another application of this device might be orienting and directing devices such as fire hoses and lasers.

12 Claims, 9 Drawing Sheets

ARTICULATABLE MECHANISM

FIELD OF THE INVENTION

The present invention relates to an articulatable mechanism useful for a variety of applications, such as pointing, orienting, and steering mechanisms, as well as to the direction of flow of liquids or gasses, maneuvering of spinning shaft, or aiming of laser beams.

PRIOR ART

A steering apparatus for steering propulsion devices is known from the U.S. Pat. No. 4,732,106 granted to Anis I. Milad (the applicant herein) on Mar. 22, 1988 and entitled "Steering Control For Submarines And The Like". This '106 patent utilizes a rotational component and a tilting component in relation to the orientation of the steered device; and the present invention constitutes a further refinement and improvement thereon.

BACKGROUND OF THE INVENTION

Typically, orienting power flow has been limited to either a linear X-Y system or fixed, radial movement of a shaft, such as a propeller shaft. It would be desirable to provide a stronger, more durable or practical steering mechanism which employed both a rotational component and a tilting component and able to withstand the rigors expected of a propulsion device.

SUMMARY OF THE INVENTION

Accordingly, it is broadly an object of the present invention to provide an improved articulatable mechanism suitable for a wide variety of purposes and product applications.

It is another object of the present invention to provide a steering mechanism which is rugged and reliable, which may be manufactured easily and economically, and which may be scaled up or down in size for a wide variety of end uses.

It is yet another object of the present invention to provide a steering apparatus for orienting power flow, which employs a rotational component in the steering function.

It is a further object of the present invention to provide a pivotal component in the steering of the power flow.

It is yet another object of the present invention to provide a pivotal and rotational component in the steering function.

To achieve the foregoing and other objects, and in accordance with the purposes of the present invention as described herein, an improved apparatus and method is provided for steering a shaft (such as a propeller shaft) coupled to a power source. The steering apparatus is comprised of steerable means for changing the pivotal angle or orientation of the shaft. The changing means is capable of being both rotatably and radially maneuvered. The steering apparatus is further comprised of operator controlled means which steer the shaft direction changing means. The operator controlled means includes means for rotating and further means for pivotally maneuvering the propeller shaft direction changing means.

Viewed in another object, the present invention discloses an articulated mechanism, including at least one member rotatable in either direction about a longitudinal axis of the mechanism. An articulatable output member is carried by the at least one rotatable member for rotation in unison therewith. This articulatable output member has a pair of respective end portions including a first end portion and a second end portion opposite to each other. A pair of slide members, including a first slide member and a second slide member, respectively, are provided. These slide members have a limited simultaneous movement parallel to the longitudinal axis and opposite to each other; and means are provided for moving the slide members in unison opposite to each other. Means are further provided to connect the one slide member to the first end portion of the articulatable output member, and to connect the second slide member to the second end portion of the articulatable output member. With this structure, the articulatable output member may pivot about an axis transverse to the longitudinal axis of the mechanism, while the articulatable output member may simultaneously rotate in either direction about the longitudinal axis.

In accordance with the teachings of the present invention, there is herein illustrated and described a preferred embodiment thereof, constituting an articulatable mechanism including a frame means. Three parallel spaced-apart gears are rotatably mounted in the frame means along a substantially coincident longitudinal axis and include a first gear, a second gear, and a third gear, respectively. The second gear has a central opening formed therein while the third gear has a slot formed therein. Two parallel shafts (constituting a first shaft and a second shaft) are rotatably journaled in the frame. The first and second shafts are disposed substantially parallel to the longitudinal axis of the first, second, and third gears, respectively. A fourth gear 4 is carried by the first shaft 22 and engages the second gear 2. The second shaft 23 carries fifth and sixth gears which engage the first gear and the third gear, respectively. A first articulatable member passes through the central opening in the second gear and is carried by the first and third gears. The first articulatable member rotates in unison with the first and third gears in either direction about the longitudinal axis. The articulatable member has a pair of slides including an upper slide and a lower slide, and these upper and lower slides have a limited longitudinal movement on the first articulatable member.

The first articulatable member has a pair of sides, to which a pair of stub shafts (constituting a first stub shaft and a second stub shaft) are rotatably journaled transversely to the longitudinal axis of the frame means. The first stub shaft carries a seventh pinion gear which engages a first rack mounted on the upper slide and a second rack mounted on the lower slide. The second stub shaft carries an eighth pinion gear which engages a third rack mounted on the upper slide and a fourth rack mounted on the lower slide; such that upon rotation of the first and second pinions, the upper and lower slides move in opposite directions on the first articulatable member. A ninth and tenth intermediate gear are mounted on the first and second stub shafts, respectively, and are spaced apart from the pinions. The second gear has a pair of oppositely-disposed faces, including a first face and a second opposite face. An eleventh face gear is located on the first face of the second gear and engages the ninth intermediate gear of the first stub shaft. A twelfth face gear is located on the second face of the second gear and engages the tenth intermediate gear mounted on the second stub shaft. An arm means is mounted on and extends from both the upper and lower slide.

A second articulatable output member is pivotally mounted on the third gear and extends through the slot formed therein. An arm means is mounted on and extends from the second articulatable output member; this arm means includes upper and lower arm means. Flexible cabling means connects the arms mounted on the second articulatable member to the arms mounted on the upper and lower slides, respectively. As a result, the second articulatable output member is capable of an unlimited arcuable path along a hemisphere of a radius equal in length to the articulatable output member pivotally originated in the slot of the third gear. The rotation of the second shaft will cause the first articulatable member and second articulatable output member to rotate in unison about the longitudinal axis of the frame means and in the direction opposite to the rotation of the second shaft. Rotation of the first shaft will cause the second articulatable output member to pivot about the plane of the face of the third gear. Braking of the first shaft, while rotating the second shaft, will produce an opposite rotation of both the first articulatable member and second articulatable output member while simultaneously causing the second articulatable output member to pivot about the plane of the face of the third gear.

For example, when the second shaft is rotated and the first shaft is braked, the first and third gears and the second articulatable output member carried on the third gear rotate in a first direction. When the first shaft is rotated and the second shaft is braked, the second gear is rotated in a direction opposite to the rotation of the first shaft and thereby causes the second articulatable output member to pivot about the plane of the face of the third gear. Furthermore, when the first and second shafts are both oppositely rotated, but in a direction toward each other, the second gear rotates in one direction to cause the upper and lower slides on the first articulatable member to oppositely reciprocate in one direction and thereby cause the second articulatable output member on the third gear to pivot in one direction in the slot formed in the third gear. When the first and second shafts are both oppositely rotated, both in a second direction away from each other, the second gear rotates in another and opposite direction to cause the upper and lower slides on the first articulatable member to oppositely reciprocate in another and opposite direction to thereby cause the second articulatable output member on the third gear to pivot in another and opposite direction in the slot formed in the third gear.

The rotation of the first and second shafts together in the same direction will cause the first articulatable member and the second articulatable output member to rotate in unison about the longitudinal axis of the frame means. The rotation occurs in both directions, alternately.

In a further aspect of the invention, in accordance with its objects and purposes, a steering apparatus is provided for steering an article to be aimed such as a laser, gun, or fire hose. The article steering apparatus is comprised of means for rotating and pivoting the article to thereby orient, point, or aim the article.

In accordance with another aspect of the invention, an apparatus is provided to steer a fluid propellant such as rocket exhaust. Means are provided to steer the exhaust by a propulsion guide that is capable of being both rotated and pivoted.

The steering apparatus of the invention is comprised of means for changing direction of the steered article or material, means for both rotating and pivoting the direction changing means, means for pivoting the means for both rotating and pivoting the direction changing means, and means for rotating the means for both rotating and pivoting the direction changing means.

Preferably, the means for pivoting the direction changing means is comprised of a first sleeve means and an articulatable projecting means flexibly attached to the first sleeve means.

Additional objects, advantages, and novel features of the invention will be set forth in part in the description that follows and in part, will become apparent to those skilled in the art upon examination of the following or may be learned with the practice of the invention. The objects and advantages of the invention may be realized and attained by means of the instrumentalities and combinations particularly pointed out in the foregoing claims.

BRIEF DESCRIPTION OF THE DRAWINGS

The accompanying drawings incorporated in and forming a part of the specification; illustrate several aspects of the present invention, and together with the description serve to explain the principles of the invention. In the drawing.

DESCRIPTION OF THE PREFERRED EMBODIMENTS

Figure 1:
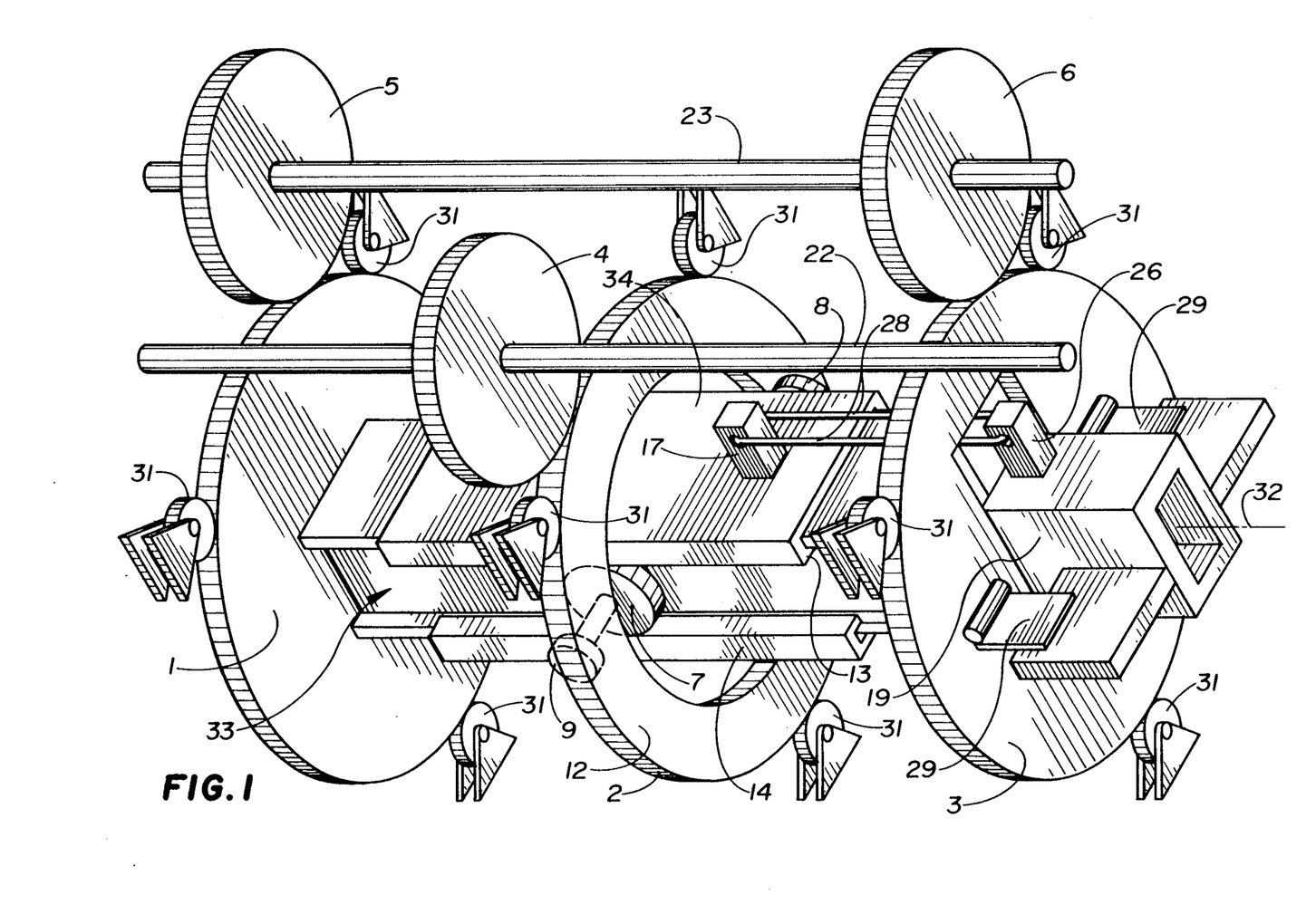
FIG. 1 is an isometric and perspective view of the structure of the present invention.

Reference is made in FIG. 1 which shows an articulatable mechanism 30 including a frame means 31. Three parallel spaced-apart gears are rotatably mounted in the frame means 31 along a substantially coincident longitudinal axis 32 and including a first gear means 1, a second gear means 2, and a third gear means 3, respectively. The second gear means 2 has a central opening 20 formed therein while the third gear means 3 has a slot 21 formed therein. A first shaft means 22 and a second shaft means 23 are rotatably journaled in the frame means 31. The first shaft means 22 and second shaft means 23 are disposed substantially parallel to the longitudinal axis 32 of the first 1, second 2, and third 3 gear means respectively. A fourth gear means 4 is carried by the first shaft means 22 and engages the second gear means 2. The second shaft means 23 carries fifth 5 and sixth 6 gear means which engage the first 1 and the third 3 gear means, respectively.

Preferably, a first articulatable member 33 passes through the central opening 20 in the second gear means 2 and is carried by the first 1 and third 3 gear means. The first articulatable member 33 rotates in unison with the first 1 and third 3 gear means in either direction about the longitudinal axis 32. The articulatable member 33 has a pair of slides including an upper slide means 34 and a lower slide means 35 having limited longitudinal movement on the first articulatable member means 33.

In the preferred embodiment, the first articulatable member 33 has a pair of stub shafts (constituting a first stub shaft means 24 and a second stub shaft means 25) rotatably journaled transversely to the longitudinal axis 32 of the frame means 31. A seventh gear means 7 is mounted on the first stub shaft means 24 engages a rack means 13 mounted on the upper slide means 34 and as well as a rack means 14 mounted on the lower slide means 35. Upon rotation of the seventh gear means 7, the upper 34 and lower 35 slide means move in opposite directions on the first articulatable member 33. The second gear means 2 has a pair of oppositely-disposed face gears including an eleventh 11 and twelfth 12 face gear means. A ninth intermediate gear means 9 is mounted on the first stub shaft means 24 and engages the eleventh face gear means 11. The twelfth face gear means 12 is located on the rearward face of the second gear means 2 and engages the tenth intermediate gear means 10 which is mounted on the second stub shaft means 25 (see FIG. 6). Arm means are mounted on and extend from the each slide 34 and 35, thereby creating an upper arm means 17 and lower arm means 18.

Figure 2:
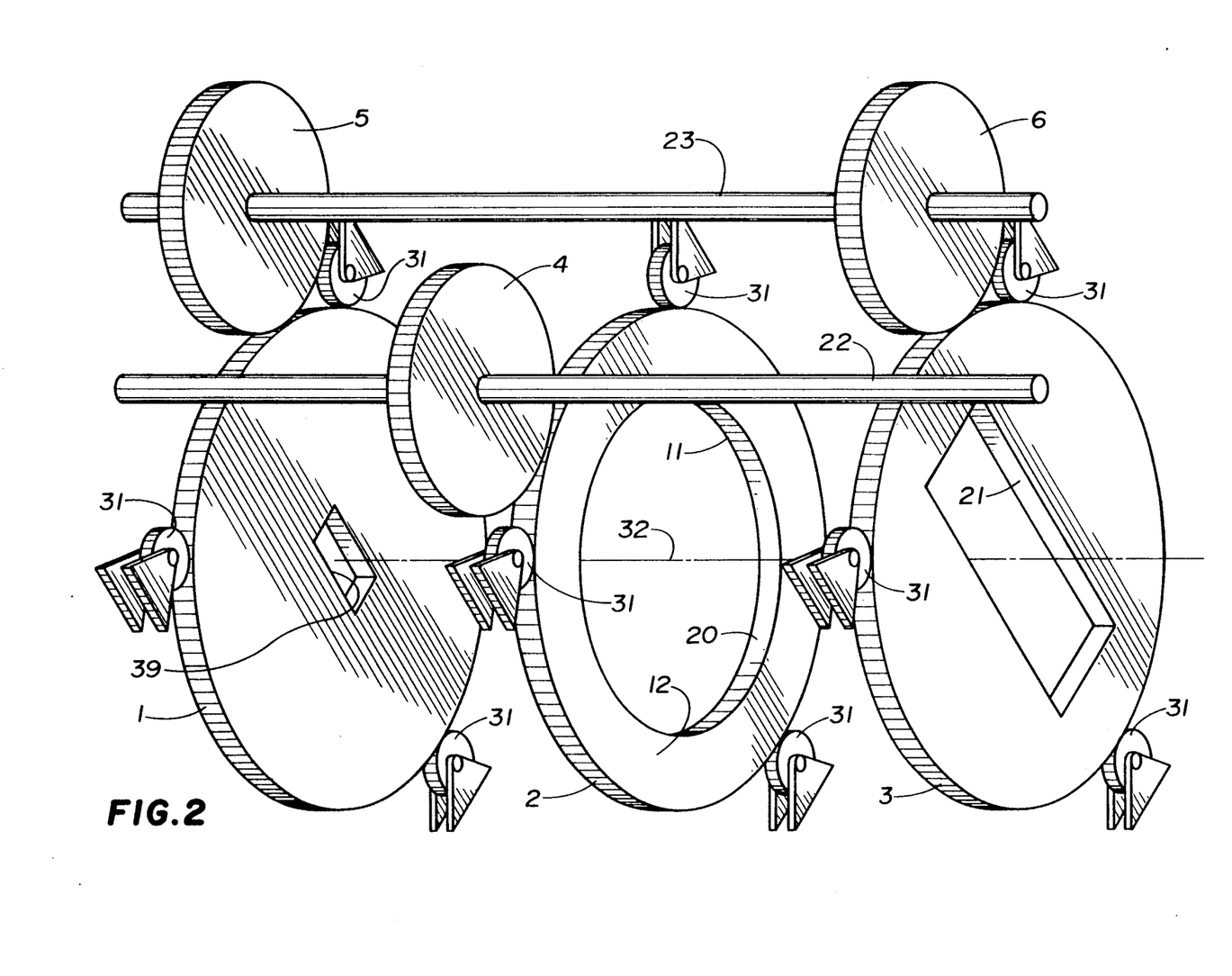
FIG. 2 depicts a perspective view of the embodiments without the first and second articulatable mechanisms.

Preferably, a second articulatable output member 19 is pivotally mounted on the third gear means 3 and extends through the slot means 21 formed therein (see FIG. 2). An upper arm means 26 and lower arm means 27 are mounted on and extend from the second articulatable output member 19. Flexible cabling means 28 connects the upper arm means 26 to the arm means 17 mounted on the upper slide means 34. Flexible cabling means 28 also connects the arm means 27 mounted on the second articulatable output member 19 to the arm means 18 mounted on the lower slide means 35. As a result, the second articulatable output member 19 is capable of an unlimited arcuable path.

In the preferred embodiment, the rotation of the second shaft means 23 will cause the first articulatable member 33 and second articulatable output member 19 to rotate in unison about the longitudinal axis 32 of the frame means 31 and in the direction opposite to the rotation of the second shaft means 23. Rotation of the first shaft means 22 will cause the second articulatable output member 19 to pivot about the plane of the face of the third gear means 3. Braking of the first shaft means 22, while rotating the second shaft means 23, will produce an opposite rotation of both the first articulatable member 33 and second articulatable output member 19 while simultaneously causing the second articulatable output member 19 to pivot about the plane of the face of the third gear means 3.

FIG. 2 illustrates a clearer, unobstructed view of the six main gears, the frame means 31, and their corresponding openings. Without the articulatable members 33 and 19, the slot 21 can be more easily discerned in the third gear means 3. In the second gear means 2, the central opening 20 is shown as is a henceforth unseen slot 39 in the first gear means 1.

Figure 3:
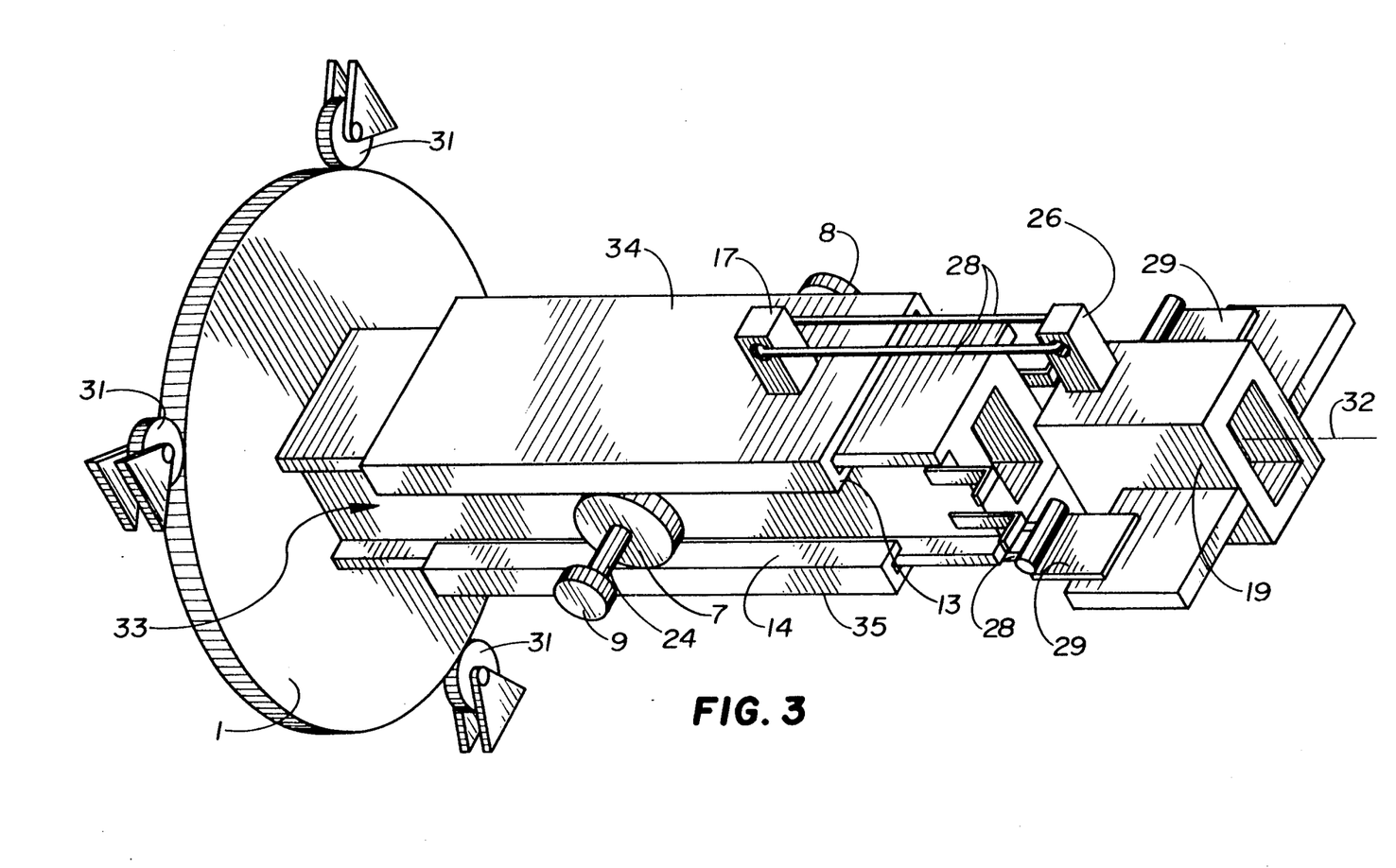
FIG. 3 is an unobstructed view of the first and second articulatable mechanisms.

FIG. 3 shows the inner components of the invention and allows an unobstructed view of the first articulatable output member 33 and the second articulatable member 19.

Figure 4:
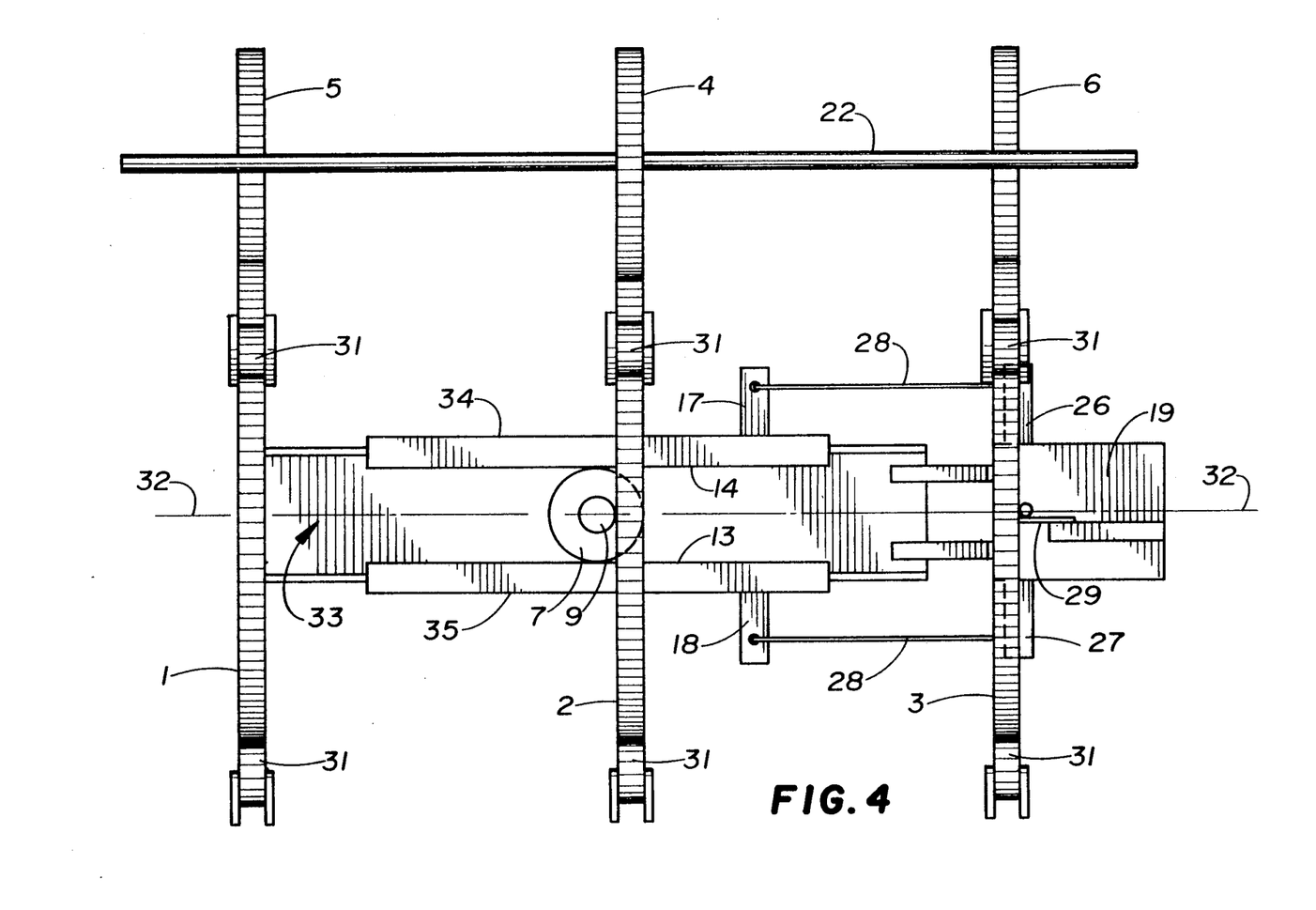
FIG. 4 is a pictorial view of the left side of the invention.

FIG. 4 shows the left side of the invention, revealing the lower arm means 18 mounted on the lower slide means 35 of the first articulatable member 33. Also shown is the flexible cabling means 28 connected to the lower arm means 27 which is mounted on the second articulatable output member 19.

Figure 5:
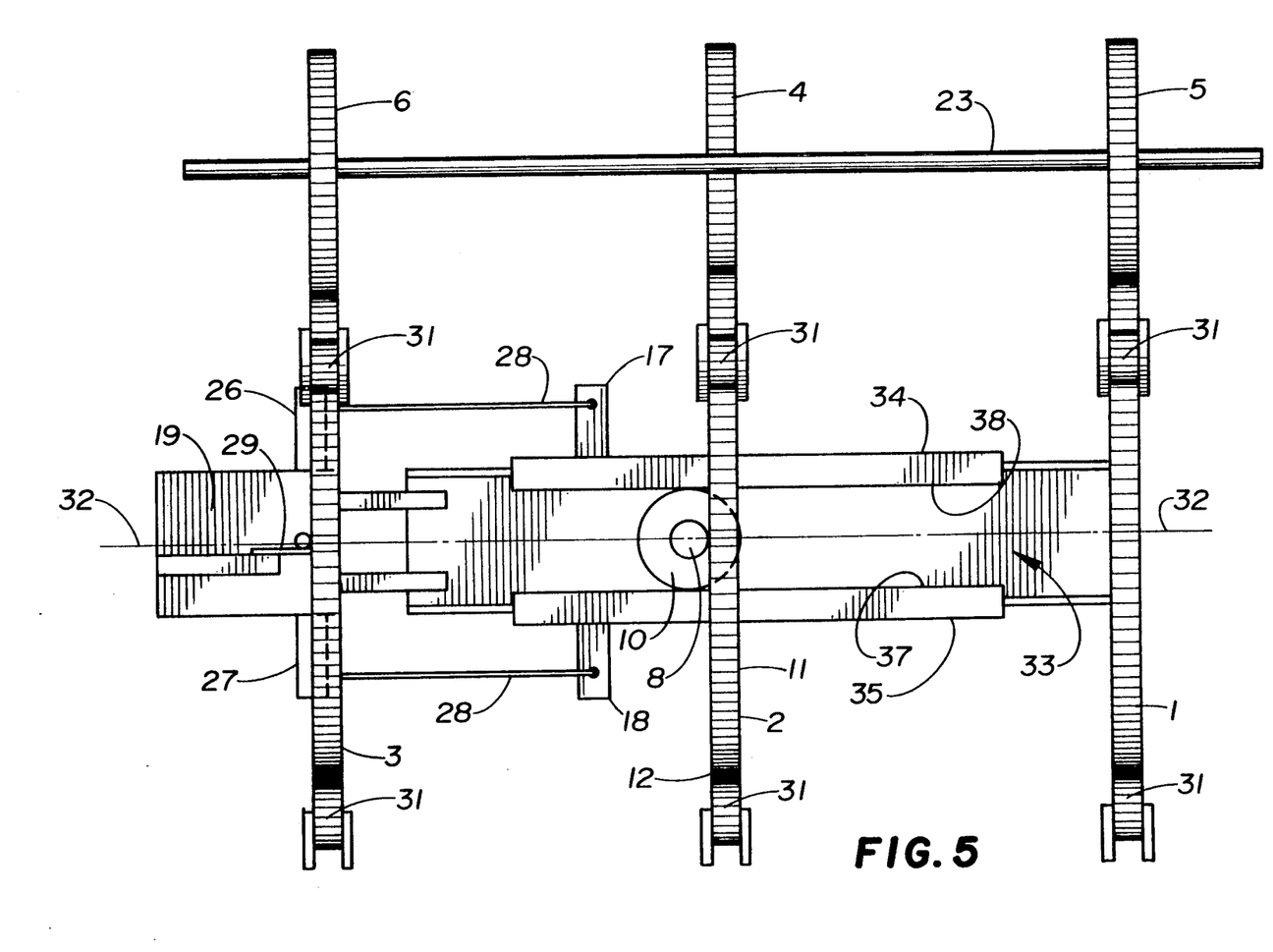
FIG. 5 is an pictorial view of the right side of the invention.

FIG. 5 shows the right side of the invention. The eighth 8 and tenth intermediate gear 10 means are mounted on the stub shaft means 25. The eighth gear means 8 is shown meshing with the twelfth face gear 12 means located on the second gear means 2. Two rack means, an upper 38 and lower 37, are designed to travel in opposite directions when the tenth intermediate gear 10 is turned.

Figure 6:
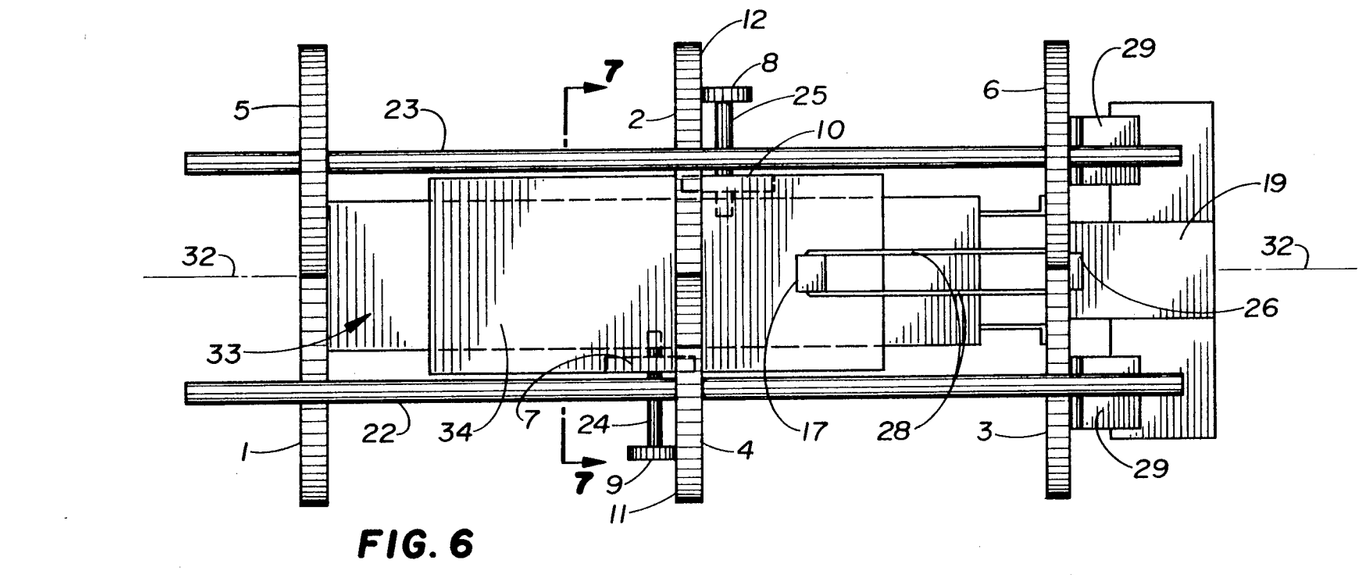
FIG. 6 shows the invention in a top view.

FIG. 6 shows the invention from the top and allows a view of the second stub shaft means 25 to which the eighth gear means 8 and the tenth intermediate gear means 10 are attached.

Figure 7:
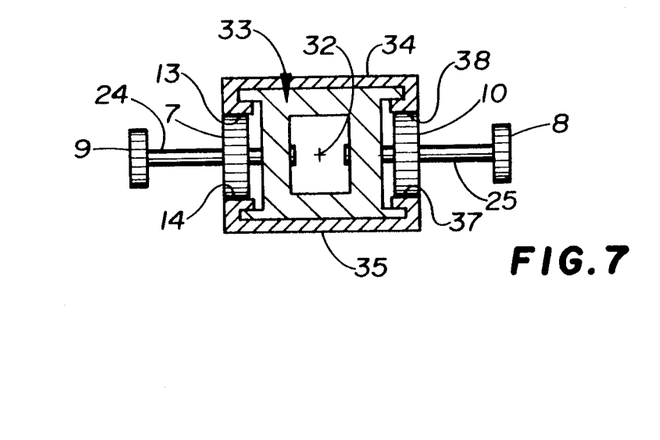
FIG. 7 is a cutaway view of the first articulatable member, the stub shafts and connected gears.

FIG. 7 depicts a cutaway view of the first articulatable member 33 revealing the stub shaft means 24 and 25 mounted to the articulatable member 33 and the innermost gears 7, 10 engaging the rack means 13, 14, 36 and 37.

Figure 8:
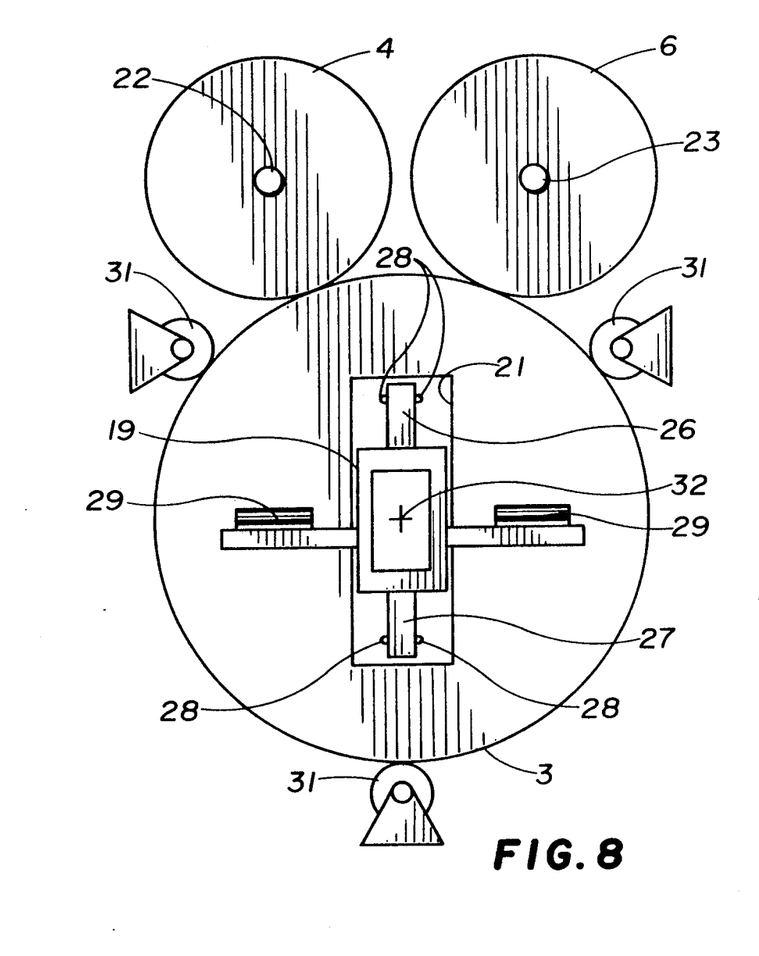
FIG. 8 shows the front end of the invention.
Figure 9:
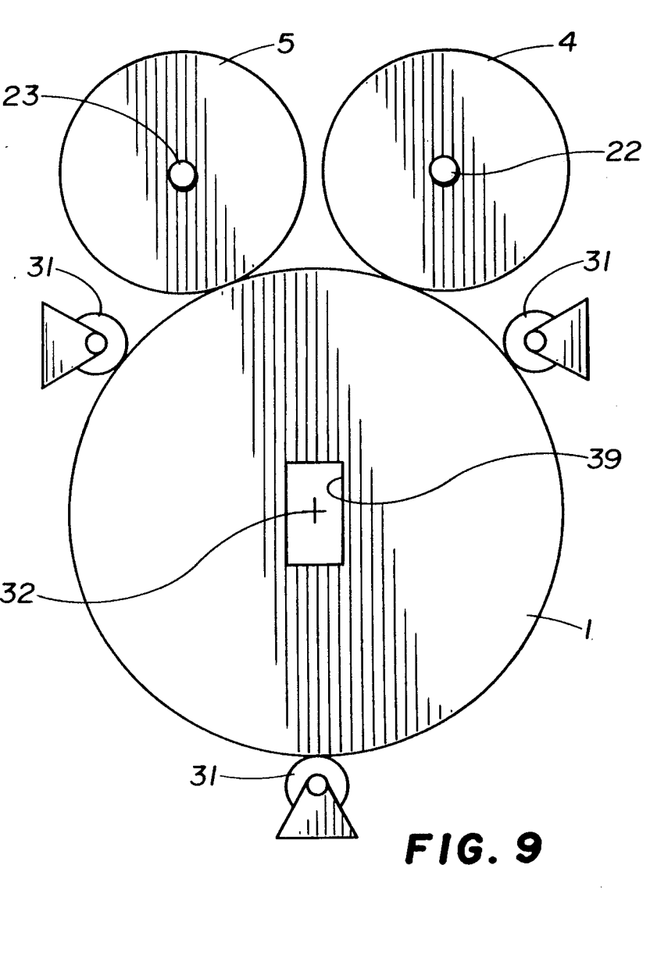
FIG. 9 is the rear view or power source end of the invention.

FIGS. 8-9 are illustrations of front and rear views, respectively. Of note on the front view (FIG. 8) are the hinge means 29 that allows the second articulatable output member 19 to pivot about the face of the third gear means 3.

Figure 10:
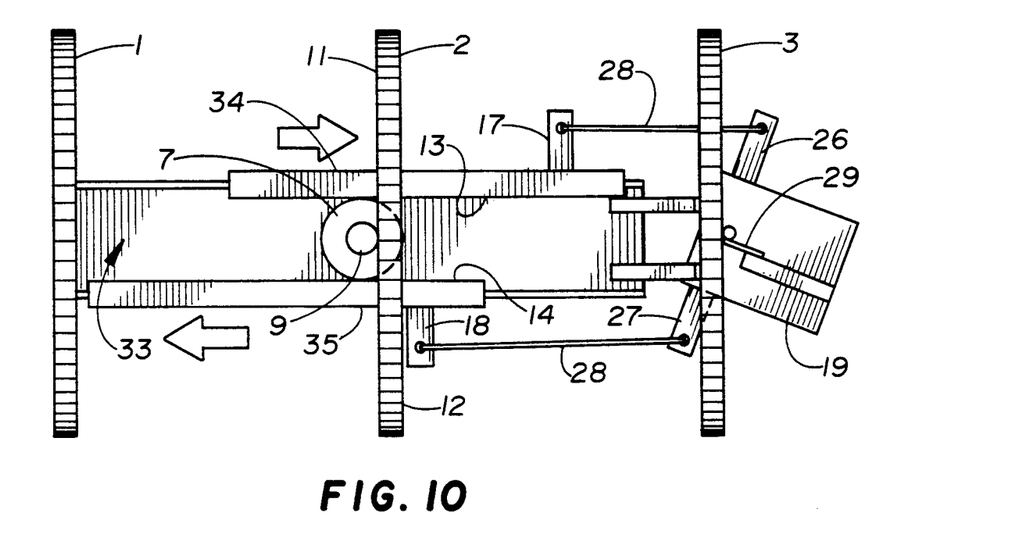
FIG. 10 is a side view depicting the articulation and orientation of the invention.
Figure 11:
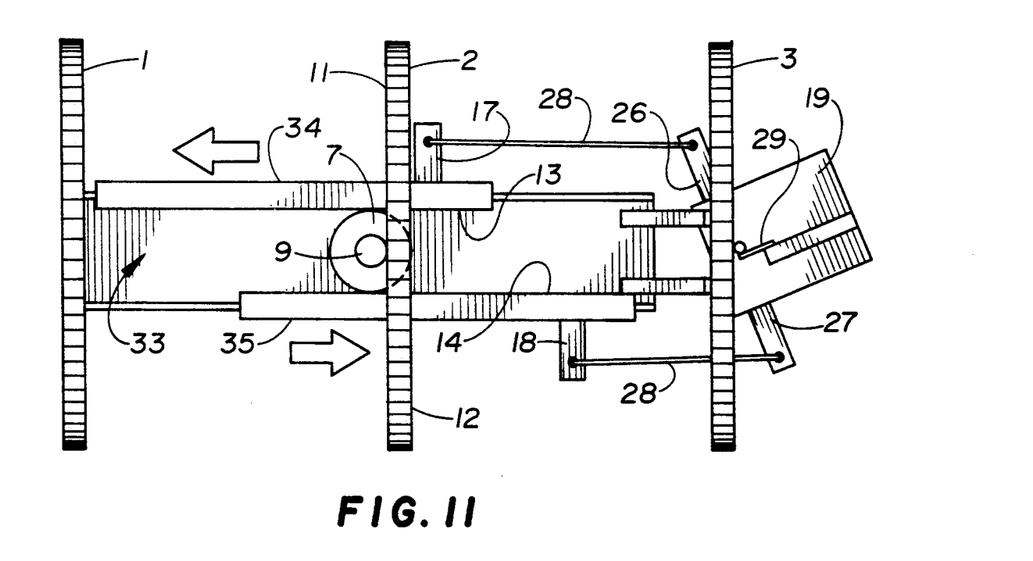
FIG. 11 shows a side view of a different articulation and orientation of the invention.

FIGS. 10-11 show tilting and articulation of the invention.

Figure 12:
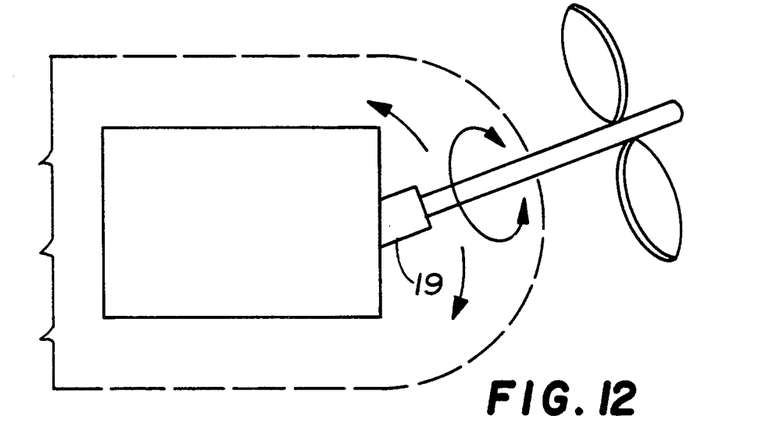
FIG. 12 shows a schematic of a submarine, boat, or amphibious vehicle enjoying propeller shaft steering using the present invention.
Figure 13:
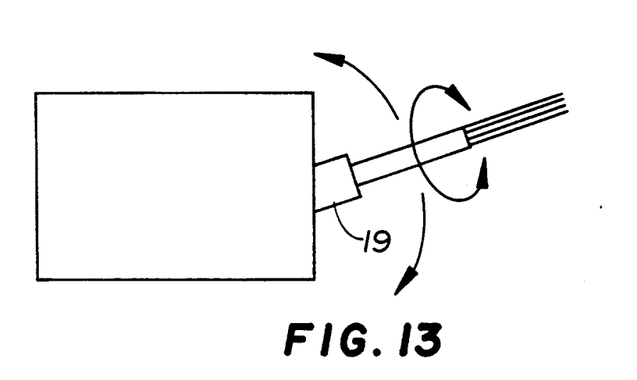
FIG. 13 shows a schematic of fluid flow or laser light orientation in accordance with the invention.
Figure 14:
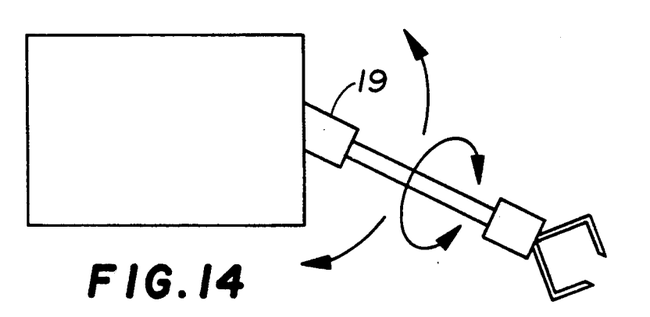
FIG. 14 shows a schematic of a robotic arm complete with end effector controlled by this invention.

FIGS. 12-14 illustrate various applications of the invention including a propeller shaft. Laser light or fluid flow and robotics end effector orientation.

Obviously, many modifications may be made without departing from the basic spirit of the present invention. Accordingly, it will be appreciated by those skilled in the art, that within the scope of the appended claims, the invention may be practiced other than has been specifically described herein.

What is claimed is:

1. An articulatable mechanism, comprising at least one first member rotatable in either direction about a longitudinal axis of the mechanism, an articulatable output member carried by the at least one rotatable member for rotation in unison therewith, the articulatable output member having a pair of respective end portions including a first end portion and a second end portion opposite to each other, a pair of slide members including a first slide member and a second slide member, respectively, and having a limited simultaneous movement parallel to the longitudinal axis and opposite to each other, means for moving the slide members in unison opposite to each other, said means for moving the slide members including a second member rotatable in either direction about a longitudinal axis, the second member being provided with a face gear, the means for moving the slide members further including a stub shaft arranged transversely of the longitudinal axis, an intermediate gear carried by the stub shaft and engaging the face gear, and a pinion mounted on the stub shaft, respective racks carried by the slide members and engaging the pinion on the stub shaft, means connecting the first slide member to the first end portion of the articulatable output member, and means connecting the second slide member to the second end portion of the articulatable output member, such that the articulatable output member may pivot about an axis transverse to the longitudinal axis of the mechanism, while the articulatable output member may simultaneously rotate in either direction about the longitudinal axis.

2. The articulatable mechanism of claim 1, further including an articulatable input member disposed along the longitudinal axis rearwardly of the one rotatable member, and wherein the first and second slide members are carried by the articulatable input member and are disposed on opposite sides thereof.

3. The articulatable mechanism of claim 2, further including a second member rotatable about the longitudinal axis, and wherein the articulatable input member is disposed within the second rotatable member.

4. An apparatus as described in claim 1, wherein said means connecting the first slide member to the first end portion of the articulatable output member, and means for connecting the second slide member to the second end portion of the articulatable output member is comprised of flexible cabling.

5. An articulatable mechanism, comprising at least one first member rotatable in either direction about a longitudinal axis of the mechanism, an articulatable output member carried by the at least one rotatable member for rotation in unison therewith, the articulatable output member having a pair of respective end portions including a first end portion and a second end portion opposite to each other, a pair of slide members including a first slide member and a second slide member, respectively, and having a limited simultaneous movement parallel to the longitudinal axis and opposite to each other, means for moving the slide members in unison opposite to each other, means connecting the first slide member to the first end portion of the articulatable output member, and means connecting the second slide member to the second end portion of the articulatable output member, such that the articulatable output member may pivot about an axis transverse to the longitudinal axis of the mechanism, while the articulatable output member may simultaneously rotate in either direction about the longitudinal axis; further including an articulatable input member disposed along the longitudinal axis rearwardly of the one rotatable member, and wherein the first and second slide members are carried by the articulatable member and disposed on opposite sides thereof; further including a second member rotatable about the longitudinal axis, and wherein the articulatable input member is disposed within the second rotatable member; and wherein the second rotatable member includes a pair of faces, each of which is provided with a face gear, respective stub shafts arranged opposite to each other and transversely of the longitudinal axis, respective intermediate gears carried by the stub shafts and engaging the respective face gears, and respective pinions mounted on the stub shafts, respectively, and respective racks carried by the slide members and engaging the pinions on the stub shafts, respectively.

6. The articulatable mechanism of claim 5, further including a frame means, a first gear rotatable journaled in the frame means, wherein the second rotatable member comprises a second gear, and wherein the first rotatable member comprises a third gear, such that the first, second and third gears are parallel to each other and spaced along the longitudinal axis.

7. The articulatable member of claim 6, further including a pair of shafts comprising a first shaft and a second shaft, respectively, a fourth gear carried by the first shaft and engaging the second gear, a fifth gear carried by the second shaft and engaging the first gear, and a sixth gear carried by the second shaft and engaging the third gear.

8. An apparatus for steering a propeller shaft connected to a rotating power source by a universal joint, said apparatus, comprising: an articulated mechanism, comprising at least one member rotatable in either direction about a longitudinal axis of the mechanism, an articulatable output member carried by the at least one rotatable member for rotation in unison therewith, the articulatable output member being joined to the propeller shaft, the articulatable output member having a pair of respective end portions including a first end portion and a second end portion opposite to each other, a pair of slide members including a first slide member and a second slide member, respectively, and having a limited simultaneous movement parallel to the longitudinal axis and opposite to each other, means for moving the slide members in unison opposite to each other, said means for moving the slide members including a second member rotatable in either direction about a longitudinal axis, the second member being provided with a face gear, the means for moving the slide members further including a stub shaft arranged transversely of the longitudinal axis, an intermediate gear carried by the stub shaft and engaging the face gear, and a pinion mounted on the stub shaft, respective racks carried by the slide members and engaging the pinion on the stub shaft, means connecting the first slide member to the first end portion of the articulatable output member, and means connecting the second slide member to the second end portion of the articulatable output member, such that the articulatable output member may pivot about an axis transverse to the longitudinal axis of the mechanism, while the articulatable output member may simultaneously rotate in either direction about the longitudinal axis.

9. An apparatus for steering a laser beam means, said steering apparatus, comprising: an articulated mechanism, comprising at least one member rotatable in either direction about a longitudinal axis of the mechanism, an articulatable output member carried by the at least one rotatable member for rotation in unison therewith, the articulatable output member being joined to the laser beam means, the articulatable output member having a pair of respective end portions including a first end portion and a second end portion opposite to each other, a pair of slide members including a first slide member and a second slide member, respectively, and having a limited simultaneous movement parallel to the longitudinal axis and opposite to each other, means for moving the slide members in unison opposite to each other, said means for moving the slide members including a second member rotatable in either direction about a longitudinal axis, the second member being provided with a face gear, the means for moving the slide members further including a stub shaft arranged transversely of the longitudinal axis, an intermediate gear carried by the stub shaft and engaging the face gear, and a pinion mounted on the stub shaft, respective racks carried by the slide members and engaging the pinion on the stub shaft, means connecting the first slide member to the first end portion of the articulatable output member, and means connecting the second slide member to the second end portion of the articulatable output member, such that the articulatable output member may pivot about an axis transverse to the longitudinal axis of the mechanism, while the articulatable output member may simultaneously rotate in either direction about the longitudinal axis.

10. An apparatus for steering a flowing fluid means, said steering apparatus, comprising: an articulated mechanism, comprising at least one member rotatable in either direction about a longitudinal axis of the mechanism, an articulatable output member carried by the at least one rotatable member for rotation in unison therewith, the articulatable output member being joined to the flowing fluid means, the articulatable output member having a pair of respective end portions including a first end portion and a second end portion opposite to each other, a pair of slide members including a first slide member and a second slide member, respectively, and having a limited simultaneous movement parallel to the longitudinal axis and opposite to each other, means for moving the slide members in unison opposite to each other, said means for moving the slide members including a second member rotatable in either direction about a longitudinal axis, the second member being provided with a face gear, the means for moving the slide members further including a stub shaft arranged transversely of the longitudinal axis, an intermediate gear carried by the stub shaft and engaging the face gear, and a pinion mounted on the stub shaft, respective racks carried by the slide members and engaging the pinion on the stub shaft, means connecting the first slide member to the first end portion of the articulatable output member, and means connecting the second slide member to the second end portion of the articulatable output member, such that the articulatable output member may pivot about an axis transverse to the longitudinal axis of the mechanism, while the articulatable output member may simultaneously rotate in either direction about the longitudinal axis.

11. An apparatus as described in claim 10, wherein said flowing fluid is exhaust gas from a rocket motor.

12. An apparatus as described in claim 10, wherein said flowing fluid is pressurized water.

* * * * *